United States Patent
Ayush et al.

(10) Patent No.: US 11,663,463 B2
(45) Date of Patent: May 30, 2023

(54) CENTER-BIASED MACHINE LEARNING TECHNIQUES TO DETERMINE SALIENCY IN DIGITAL IMAGES

(71) Applicant: Adobe Inc., San Jose, CA (US)

(72) Inventors: Kumar Ayush, Noida (IN); Atishay Jain, Delhi (IN)

(73) Assignee: Adobe Inc., San Jose, CA (US)

( * ) Notice: Subject to any disclaimer, the term of this patent is extended or adjusted under 35 U.S.C. 154(b) by 923 days.

(21) Appl. No.: 16/507,300

(22) Filed: Jul. 10, 2019

(65) Prior Publication Data

US 2021/0012201 A1  Jan. 14, 2021

(51) Int. Cl.
*G06N 3/08* (2023.01)
*G06N 3/082* (2023.01)
(Continued)

(52) U.S. Cl.
CPC ............. *G06N 3/08* (2013.01); *G06F 18/213* (2023.01); *G06N 3/082* (2013.01); *G06V 10/454* (2022.01);
(Continued)

(58) Field of Classification Search
CPC ...... G06K 9/6232; G06N 3/0454; G06N 3/08; G06N 3/082; G06N 3/045; G06V 10/40; (Continued)

(56) References Cited

U.S. PATENT DOCUMENTS

| 10,902,279 B2 * | 1/2021 | Tawari .................. G06N 3/045 |
| 2016/0086052 A1 * | 3/2016 | Piekniewski ........ G06V 10/451 382/103 |

(Continued)

FOREIGN PATENT DOCUMENTS

WO  WO-2019136591 A1 *  7/2019 ........... G06K 9/6262

OTHER PUBLICATIONS

"Convolutional Neural Networks (LeNet)", Available online at: http://deeplearning.net/tutorial/lenet.html, Accessed from Internet on Jul. 11, 2019, 11 pages.

(Continued)

*Primary Examiner* — Chau T Nguyen
(74) *Attorney, Agent, or Firm* — Kilpatrick Townsend & Stockton LLP (57) ABSTRACT

A location-sensitive saliency prediction neural network generates location-sensitive saliency data for an image. The location-sensitive saliency prediction neural network includes, at least, a filter module, an inception module, and a location-bias module. The filter module extracts visual features at multiple contextual levels, and generates a feature map of the image. The inception module generates a multi-scale semantic structure, based on multiple scales of semantic content depicted in the image. In some cases, the inception block performs parallel analysis of the feature map, such as by parallel multiple layers, to determine the multiple scales of semantic content. The location-bias module generates a location-sensitive saliency map of location-dependent context of the image based on the multi-scale semantic structure and on a bias map. In some cases, the bias map indicates location-specific weights for one or more regions of the image.

20 Claims, 6 Drawing Sheets

(51) Int. Cl.
    *G06V 30/262* (2022.01)
    *G06F 18/213* (2023.01)
    *G06V 10/46* (2022.01)
    *G06V 10/82* (2022.01)
    *G06V 10/44* (2022.01)

(52) U.S. Cl.
    CPC ............ *G06V 10/464* (2022.01); *G06V 10/82* (2022.01); *G06V 30/274* (2022.01)

(58) Field of Classification Search
    CPC .... G06V 10/454; G06V 10/464; G06V 10/82; G06V 30/274; G06F 18/213
    See application file for complete search history.

(56) References Cited

U.S. PATENT DOCUMENTS

| | | | | |
|---|---|---|---|---|
| 2017/0206440 | A1* | 7/2017 | Schrier | G06V 10/449 |
| 2018/0129742 | A1* | 5/2018 | Li | G06N 3/0454 |
| 2019/0147288 | A1* | 5/2019 | Gupta | G06N 3/045 |
| | | | | 715/253 |
| 2019/0251707 | A1* | 8/2019 | Gupta | G06N 3/0454 |

OTHER PUBLICATIONS

Awh et al., "Interactions Between Attention and Working Memory", Neuroscience, vol. 139, No. 1, Apr. 28, 2006, pp. 201-208.

Barthelme et al., "Modeling Fixation Locations Using Spatial Point Processes", Journal of Vision, vol. 13, No. 12, Available online at: http://www.journalofvision.org/content/13/12/1, Oct. 2013, pp. 1-34.

Borji et al., "Analysis of Scores, Datasets, and Models in Visual Saliency Prediction", IEEE International Conference on Computer Vision, Dec. 2013, pp. 921-928.

Borji et al., "Cat2000: A Large Scale Fixation Dataset for Boosting Saliency Research", Available online at: https://arxiv.org/abs/1505.03581, May 14, 2015, 4 pages.

Borji , "What is a Salient Object? A Dataset and a Baseline Model for Salient Object Detection", IEEE Transactions on Image Processing, vol. 24, No. 2, Dec. 8, 2014, pp. 742-756.

Bottou , "Large-scale Machine Learning With Stochastic Gradient Descent", 19th International Conference on Computational Statistics, Aug. 22-27, 2010, pp. 177-186.

Bruce et al., "Saliency Based on Information Maximization", Proceedings of the 18th International Conference on Neural Information Processing Systems, Dec. 5-8, 2005, pp. 1-8.

Bylinskii et al., "Intrinsic and Extrinsic Effects on Image Memorability", Vision Res., vol. 116, Pt B, Nov. 2015, pp. 165-178.

Bylinskii et al., "MIT Saliency Benchmark", Available online at: http://saliency.mit.edu/, Accessed from Internet on Jul. 11, 2019, 20 pages.

Chatfield et al., "Return of the Devil in the Details: Delving Deep Into Convolutional Nets", Available online at: https://arxiv.org/abs/1405.3531, Nov. 5, 2014, 11 pages.

Chen et al., "A Visual Attention Model for Adapting Images on Small Displays", Multimedia Systems, vol. 4, No. 9, Oct. 2003, pp. 353-364.

Chen et al., "Semantic Image Segmentation With Deep Convolutional Nets and Fully Connected CRFs", International Conference on Learning Representations, Available online at: https://arxiv.org/abs/1412.7062, Jun. 7, 2016, 14 pages.

Cheng et al., "Global Contrast Based Salient Region Detection", IEEE Transactions on Pattern Analysis and Machine Intelligence, vol. 37, No. 3, Mar. 2015, pp. 569-582.

Collobert et al., "A Unified Architecture for Natural Language Processing: Deep Neural Networks With Multitask Learning", Proceedings of the 25th International Conference on Machine Learning, Jul. 5-9, 2008, pp. 160-167.

Connor et al., "Visual Attention: Bottom-Up Versus Top-Down", Current Biol., vol. 14, No. 19, Oct. 5, 2004, pp. R850-R852.

Erdem et al., "Visual Saliency Estimation by Nonlinearly Integrating Features Using Region Covariances", Journal of Vision, vol. 13, No. 4, Mar. 18, 2013, pp. 1-20.

Frintrop et al., "Computational Visual Attention Systems and their Cognitive Foundations: A Survey", ACM Transactions on Applied Perception (TAP), vol. 7, No. 1, Article No. 6, Jan. 2010, 46 pages.

Garcia-Diaz et al., "On the Relationship Between Optical Variability, Visual Saliency, and Eye Fixations: A Computational Approach", Journal of Vision, vol. 12, No. 6, Available online at: http://www.journalofvision.org/content/12/6/17, Jun. 12, 2012, 22 pages.

Hadizadeh et al., "Saliency-Aware Video Compression", IEEE Transactions on Image Processing, vol. 23, No. 1, Jan. 2014, pp. 19-33.

Harel et al., "Graph-Based Visual Saliency", Proceedings of the 19th International Conference on Neural Information Processing Systems, Dec. 4-7, 2006, pp. 545-552.

Hinton et al., "Deep Neural Networks for Acoustic Modeling in Speech Recognition: The Shared Views of Four Research Groups", IEEE Signal Processing Magazine, vol. 29, No. 6, Nov. 2012, pp. 82-97.

Huang et al., "Salicon: Reducing the Semantic Gap in Saliency Prediction by Adapting Deep Neural Networks", IEEE International Conference on Computer Vision (ICCV), Dec. 7-13, 2015, pp. 262-270.

Itti et al., "A Model of Saliency-Based Visual Attention for Rapid Scene Analysis", IEEE Transactions on Pattern Analysis and Machine Intelligence, vol. 20, No. 11, Nov. 1998, pp. 1254-1259.

Itti , "Visual Salience", Scholarpedia, vol. 2, No. 9, Accessed from Internet on Jul. 10, 2019, 9 pages.

Jia et al., "Caffe: Convolutional Architecture for Fast Feature Embedding", Available online at: https://arxiv.org/abs/1408.5093, Jun. 20, 2014, 4 pages.

Jiang et al., "Salicon: Saliency in Context", IEEE Conference on Computer Vision and Pattern Recognition (CVPR), Jun. 7-12, 2015, pp. 1072-1080.

Judd et al., "A Benchmark of Computational Models of Saliency to Predict Human Fixations", Computer Science and Artificial Intelligence Laboratory Technical Report, MIT-CSAIL-TR2012-001, Available online at: http://hdl.handle.net/1721.1/68590, Jan. 13, 2012, 22 pages.

Judd et al., "Learning to Predict Where Humans Look", IEEE 12th International Conference on Computer Vision, Sep.-Oct. 2009, pp. 2106-2113.

Khatoonabadi et al., "How Many Bits Does It Take for a Stimulus to be Salient?", IEEE Conference on Computer Vision and Pattern Recognition (CVPR), Jun. 7-12, 2015, pp. 5501-5510.

Koch et al., "Shifts in Selective Visual Attention: Towards the Underlying Neural Circuitry", Human Neurobiol., vol. 4, No. 4, 1985, pp. 219-227.

Kountchev et al., "Advances in Reasoning-Based Image Processing Intelligent Systems: Conventional and Intelligent Paradigms", Springer, vol. 29, Available online at: http://www.springer.com/in/book/9783642246920, Jan. 2012.

Krizhevsky et al., "ImageNet Classification with Deep Convolutional Neural Networks", Proceedings of the 25th International Conference on Neural Information Processing Systems, vol. 1, Dec. 3-6, 2012, pp. 1097-1105.

Kruthiventi et al., "Saliency Unified: A Deep Architecture for Simultaneous Eye Fixation Prediction and Salient Object Segmentation", IEEE Conference on Computer Vision and Pattern Recognition (CVPR), Jun. 27-30, 2016, pp. 5781-5790.

Kummerer et al., "Deep Gaze I: Boosting Saliency Prediction With Feature Maps Trained on ImageNet", International Conference on Learning Representations, Available online at: https://arxiv.org/abs/1411.1045, Apr. 9, 2015, 12 pages.

Lang et al., "Depth Matters: Influence of Depth Cues on Visual Saliency", European Conference on Computer Vision, Part of the Lecture Notes in Computer Science Book Series, vol. 7573, Jan. 2012, pp. 101-115.

Li et al., "The Secrets of Salient Object Segmentation", IEEE Conference on Computer Vision and Pattern Recognition, Jun. 23-28, 2014, pp. 280-287.

(56) References Cited

OTHER PUBLICATIONS

Li et al., "Visual Saliency Based on Multiscale Deep Features", Available online at: https://arxiv.org/abs/1503.08663, Apr. 10, 2015, 9 pages.
Lin et al., "Microsoft COCO: Common Objects in Context", European Conference on Computer Vision, Feb. 21, 2015, pp. 740-755.
Liu et al., "Predicting Eye Fixations Using Convolutional Neural Networks", IEEE Conference on Computer Vision and Pattern Recognition (CVPR), Jun. 7-15, 2015, pp. 362-370.
Liu et al., "Saliency Detection Using Regional Histograms", Opt. Lett., vol. 38, No. 5, Mar. 1, 2013, pp. 700-702.
Long et al., "Fully Convolutional Networks for Semantic Segmentation", Available online at: https://arxiv.org/pdf/1411.4038.pdf, Mar. 8, 2015, pp. 3431-3440.
Meur et al., "Methods for Comparing Scanpaths and Saliency Maps: Strengths and Weaknesses", Behavior Research Methods, vol. 45, No. 1, Mar. 2013, pp. 251-266.
Niebur, "Saliency Map", Scholarpedia, vol. 2, No. 8, 2007, p. 2675.
Oliva et al., "Top-Down Control of Visual Attention in Object Detection", Proceedings International Conference on Image Processing, vol. 1, Sep. 14-17, 2003, pp. I-253-I-256.
Pan et al., "Shallow and Deep Convolutional Networks for Saliency Prediction", Available online at: https://arxiv.org/abs/1603.00845, Mar. 2, 2016, 10 pages.
Peters et al., "Applying Computational Tools to Predict Gaze Direction in Interactive Visual Environments", ACM Transactions on Applied Perception (TAP), vol. 5, No. 2, Article No. 9, May 2008, 19 pages.
Peters et al., "Components of Bottom-up Gaze Allocation in Natural Images", Vision Res., vol. 45, No. 8, Aug. 2005, pp. 2397-2416.
Porikli et al., "Covariance Tracking Using Model Update Based on Lie Algebra", Conference on Computer Vision and Pattern Recognition (CVPR), Jun. 2006, pp. 728-735.
Rapantzikos et al., "Dense Saliency-based Spatiotemporal Feature Points for Action Recognition", IEEE Conference on Computer Vision and Pattern Recognition, Jun. 20-25, 2009, pp. 1454-1461.
Razavian et al., "CNN Features Off-the-shelf: An Astounding Baseline for Recognition", IEEE Conference on Computer Vision and Pattern Recognition, May 12, 2014, pp. 512-519.
Riche et al., "Saliency and Human Fixations: State-of-the-art and Study of Comparison Metrics", IEEE International Conference on Computer Vision, Dec. 1-8, 2013, pp. 1153-1160.
Russakovsky et al., "ImageNet Large Scale Visual Recognition Challenge", International Journal of Computer Vision, vol. 115, No. 3, Jan. 30, 2015, 43 pages.
Shen et al., "Learning to Predict Eye Fixations for Semantic Contents Using Multilayer Sparse Network", Neurocomputing, vol. 138, Aug. 22, 2014, pp. 61-68.
Sheth et al., "Object Saliency Using a Background Prior", IEEE International Conference on Acoustics, Speech and Signal Processing (ICASSP), Mar. 20-25, 2016, pp. 1931-1935.
Simonyan et al., "Very Deep Convolutional Networks for Large-Scale Image Recognition", ICLR, Available online at: https://arxiv.org/abs/1409.1556, Apr. 10, 2015, 14 pages.
Srivastava et al., "Dropout: A Simple Way to Prevent Neural Networks from Overfitting", Journal of Machine Learning Research, vol. 15, No. 1, Jun. 2014, pp. 1929-1958.
Srivatsa et al., "Salient Object Detection via Objectness Measure", IEEE International Conference on Image Processing (ICIP), Jun. 24, 2015, pp. 4481-4485.
Szegedy et al., "Going Deeper with Convolutions", Available online at: https://arxiv.org/abs/1409.4842, Sep. 17, 2014, 12 pages.
Tatler, "The Central Fixation Bias in Scene Viewing: Selecting an Optimal Viewing Position Independently of Motor Biases and Image Feature Distributions", Journal of Vision, vol. 7, No. 14, Nov. 21, 2007, pp. 1-17.
Treisman et al., "A Feature-Integration Theory of Attention", Cognitive Psychology, vol. 12, No. 1, Jan. 1980, pp. 97-136.
Tseng et al., "Quantifying Center Bias of Observers in Free Viewing of Dynamic Natural Scenes", Journal of Vision, vol. 9, No. 7, Jul. 9, 2009, 16 pages.
Valenti et al., "Image Saliency by Isocentric Curvedness and Color", Proceedings of International Conference on Computer Vision, Sep.-Oct. 2009, pp. 2185-2192.
Vig et al., "Large-Scale Optimization of Hierarchical Features for Saliency Prediction in Natural Images", IEEE Conference on Computer Vision and Pattern Recognition, Jun. 23-28, 2014, pp. 2798-2805.
Walther et al., "Attentional Selection for Object Recognition—A Gentle Way", Proceedings of the Second International Workshop on Biologically Motivated Computer Vision, Nov. 22-24, 2002, pp. 472-479.
Xu et al., "Predicting Human Gaze Beyond Pixels", Journal of Vision, vol. 14, No. 1, Jan. 28, 2014, pp. 1-20.
Yang et al., "What is the Chance of Happening: A New Way to Predict Where People Look", European Conference on Computer Vision, 2010, pp. 631-643.
Yubing et al., "A Spatiotemporal Saliency Model for Video Surveillance", Cognitive Computation, vol. 3, No. 1, Mar. 2011, pp. 241-263.
Zhang et al., "Saliency Detection: A Boolean Map Approach", IEEE International Conference on Computer Vision, Dec. 1-8, 2013, pp. 153-160.
Zhao et al., "Learning a Saliency Map Using Fixated Locations in Natural Scenes", Journal of Vision, vol. 11, No. 3, Mar. 10, 2011, 15 pages.
Zhao et al., "Saliency Detection by Multi-Context Deep Learning", IEEE Conference on Computer Vision and Pattern Recognition (CVPR), Jun. 7-12, 2015, pp. 1265-1274.
Zhou et al., "Learning Deep Features for Scene Recognition Using Places Database", Proceedings of the 27th International Conference on Neural Information Processing Systems, vol. 1, Dec. 8-13, 2014, pp. 487-495.

* cited by examiner

CENTER-BIASED MACHINE LEARNING TECHNIQUES TO DETERMINE SALIENCY IN DIGITAL IMAGES

TECHNICAL FIELD

This disclosure relates generally to the field of artificial intelligence, and more specifically relates to neural networks for determining saliency in an image.

BACKGROUND

Understanding and predicting human visual attention mechanisms is an active area of research in the fields of neuroscience and computer vision. Knowing where people look and click on visual designs can provide clues about how the designs are perceived, and where the most important or relevant content lies. Relatively important content of a visual design can be used for effective summarization, to facilitate retrieval from a database, or to perform other actions based on a viewer's focus with respect to visual content. Image saliency is used in a wide variety of technical fields, such as image cropping, video compression, artificial vision, autonomous navigation, graphical design, surveillance systems, and other example fields of technical applications.

Existing techniques involve saliency prediction networks having an architecture combining one or more spatially invariant neural networks and one or more hand-crafted features to determine saliency of a received image. However, a spatially invariant neural network does not determine saliency based on locational context of image content. Locational context includes, for example, relationships between content depicted in areas of an image, such as a grouping of objects, or interactions between figures. A conventional spatial-invariant neural network, for example, attempts to determine saliency without analyzing the locational context of image regions. But, in some cases, failing to account for the locational context of the image causes the conventional spatial-invariant neural network to generate incomplete or inaccurate saliency information. In addition, by failing to account for locational context, the conventional spatial-invariant neural network does not provide saliency data that accurately represents human visual attention mechanisms.

It is desirable to develop machine-learning techniques that provide accurate saliency data for an image, based on the locational context of content depicted in the image. It is also desirable to develop machine-learning techniques that determine saliency based on accurate models of human visual attention mechanisms.

SUMMARY

According to certain embodiments, a location-sensitive saliency prediction neural network receives a graphical digital image. The location-sensitive saliency prediction neural network includes a filter module, an inception module, and a location-bias module. Based on the image, the filter module extracts visual features at multiple contextual levels, and generates a feature map of the extracted visual features. In some embodiments, the inception module analyzes the feature map to determine semantic content of the image at multiple scales. Based on the multiple scales of semantic content, the inception module generates a multi-scale semantic structure. The location-bias module generates a saliency map of location-dependent context of the image based on the multi-scale semantic structure and on a bias map. In some cases, the bias map indicates location-specific weights for one or more regions of the image. The location-sensitive saliency prediction neural network provides the saliency map to an image interpretation system.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

As discussed above, prior techniques for determining saliency data for an image do not provide location-sensitive saliency data, such as saliency data based on locational context of an image. In addition, prior techniques for spatially invariant saliency prediction do not accurately model human visual attention mechanisms. For example, a contemporary saliency prediction network that applies a location correction factor (e.g., as a post-processing stage after a spatially invariant image analysis) does not accurately model an attention mechanism that incorporates locational context during analysis.

Certain embodiments described herein provide for a location-sensitive saliency prediction neural network for accurately determining location-sensitive saliency data, modeling one or more human visual attention mechanisms, or both. In some cases, the location-sensitive saliency prediction neural network uses multiple sub-networks configured to determine semantic content of an image at multiple scales, where using multiple scales of image content resembles a reflexive attention mechanism used by humans to quickly analyze a visual scene. Based on the multi-scale semantic data, the location-sensitive saliency prediction neural network determines locations of content in the image at a local level and at a global level, and also determines saliency data for the image from the multi-scale semantic data. This location-sensitive saliency data can be used in a variety of operations by end-user systems (e.g., returning search results, facilitating autonomous navigation).

The following examples are provided to introduce certain embodiments of the present disclosure. In this example, a location-sensitive saliency prediction neural network receives a digital graphical image, such as an image of two people shaking hands. The location-sensitive saliency prediction neural network identifies visual features of the image at multiple scales. Determining visual features at multiple scales includes, for example, identifying lower level features, such as colors of clothing worn by the people, higher level features, such as identifying the figures as standing humans, and global-level features, such as identifying interactions (e.g., the handshake) between the figures. To do so, the location-sensitive saliency prediction neural network applies, to the digital image, a filter module having various filter blocks for analyzing the image at multiple contextual levels, including at least a local level and a global level. For example, a filter block with a relatively large number of channels, a relatively large receptive field, or both is used to detect features at a global level, such as based on larger areas of the image. An additional filter block with a relatively small number of channels, a relatively small receptive field, or both is used to detect features at a local level, such as based on smaller areas of the image.

Continuing with this example, the location-sensitive saliency prediction neural network generates a multi-scale semantic structure of the image from the determined visual features. For the example handshake image, a multi-scale semantic structure could include local semantic content, such as content represented in small areas of the image, and also global semantic content, such as content represented in a large or global area(s) of the image. To generate the multi-scale semantic structure, an inception module of the location-sensitive saliency prediction neural network is applied to the visual features that are identified by the filter module. In some cases, the inception module includes multiple blocks. Each inception block includes multiple layers that operate in parallel to determine to characterize the semantic structure at multiple scales. An inception block having a layer with a relatively small kernel size determines semantic structure at a relatively small scale. For instance, a small-scale layer in the inception block could determine a semantic structure representing local semantic content, such as grey-colored clothing, standing human figures, or other smaller details of the example image. In parallel within the example inception block, another layer with a relatively large kernel size determines semantic structure at a relatively large scale. For instance, the large-scale layer in the inception block could determine a semantic structure representing global semantic content, such as business clothing, people approaching each other, people with hand contact, or other overarching characteristics of the image. In some cases, determining the visual features and the semantic structure at multiple scales improves accuracy of the image analysis by, for example, accounting for large-scale or global context as well as local context. Additionally or alternatively, determining the visual features and the semantic structure at multiple scales more accurately models human visual attention mechanisms that simultaneously interpret multiple scales of context during analysis of a scene.

The example location-sensitive saliency prediction neural network also generates a saliency map with location-sensitive saliency data from the multi-scale semantic structure. For instance, in the example above, location-sensitive saliency data could represent location-dependent viewing patterns, such as where a person is likely to focus first on an image. An example of a location-dependent viewing pattern is a center-bias of viewer eye fixations (e.g., a tendency of a person to look towards a center of an image). The location-sensitive saliency prediction neural network generates the location-sensitive saliency map by applying a location-bias module to the multi-scale semantic structure. The location-bias module includes a bias map having location-specific features that correspond to regions of the image. The location-bias module generates the location-sensitive saliency map based on a combination of multi-scale semantics and location-dependent viewing patterns, such as by combining location-specific features in the bias map with the multi-scale semantic structure. In some cases, combining the bias map with the multi-scale semantic structure optimizes the location-sensitive saliency map, by providing location-sensitive saliency data that accurately represents a center-bias of a person viewing multi-scale semantic content in an image. For the example handshake image, applying the location-specific features of the bias map to the multi-scale semantic structure may provide information about where a person viewing the image is likely to focus attention, such as focusing on the faces of the people, on the contacted hands, on an object that is between or in front of the handshaking figures, or other areas of attention. The location-sensitive saliency map is provided to an image interpretation system used by a computing environment. Examples of these computing environments include a search engine for retrieving visual content, a navigation system using image data, or other computing systems that perform image analysis.

A location-sensitive saliency prediction neural network that generates location-sensitive saliency data can be used with image interpretation systems for visual science applications in a variety of fields, including image/video compression, image/video cropping, image/video categorization, image/video search and retrieval systems, artificial vision, autonomous navigation, graphical design, surveillance systems, medical assistive vision systems, user interface design, and other fields. In many applications, image interpretation systems are used to provide rapid and accurate analysis of one or more images, including in some cases real-time analysis of a stream of images (e.g., video-based artificial vision systems). However, existing image interpretation systems that use spatially invariant saliency prediction systems could generate results based on inaccurate saliency data, or saliency data that does not reflect a human attention model. The use of inaccurate saliency data may result in inefficient use of computing resources, such as analyzing image regions that do not include salient content. In some applications, such as medical assistive vision systems, user interface design, or robotic vision systems, use of saliency data that does not reflect a human attention model may result in frustration or potentially dangerous situations for a person who is interacting with the image interpretation system. In some cases, technical applications that use location-sensitive saliency data are able to perform image analysis more efficiently based on saliency data that accurately simulates human visual attention mechanisms.

The location-sensitive saliency prediction neural network described herein is readily useable with image interpretation systems to provide accurate and human-centric saliency data. For instance, an image interpretation system can use location-sensitive saliency data generated by embodiments described herein to more efficiently perform operations, such as providing more accurate search results that match the location-sensitive saliency data, more efficient navigation of a robot or self-driving vehicle, better user interface analysis to develop interfaces with improved functionality and user-friendliness, and other technical applications.

As used herein, the terms "salient" and "saliency" refer to visual regions that draw attention to themselves, relative to other visual regions. A salient area of an image, for example, is an area having visual characteristics that encourage the attention of a viewer. Based on visual characteristics such as color, size, or position, the viewer is encouraged to quickly look towards the salient area, and to spend additional time viewing the salient area, as compared to additional areas of the image that are less salient. In some cases, saliency for a region is determined based on relative relationships between visual characteristics of the region and additional visual characteristics of additional regions. For example, in an image depicting a bright red ball, a region including the bright red ball has a high saliency compared to additional image regions that depict a dull grey background. However, if the image depicts a large number of brightly colored red balls, the example region including the bright red ball could have a low saliency compared to additional image regions depicting the other brightly colored red balls.

In some cases, saliency arises from various characteristics. Saliency of an image is based on, for example, low-level features of the image, such as color, intensity, orientation, size, or other features describing lower-level characteristics. Additionally or alternatively, the image saliency is based on higher-level features of the image, such as faces, human figures, text, or other features describing higher level characteristics.

Figure 1:
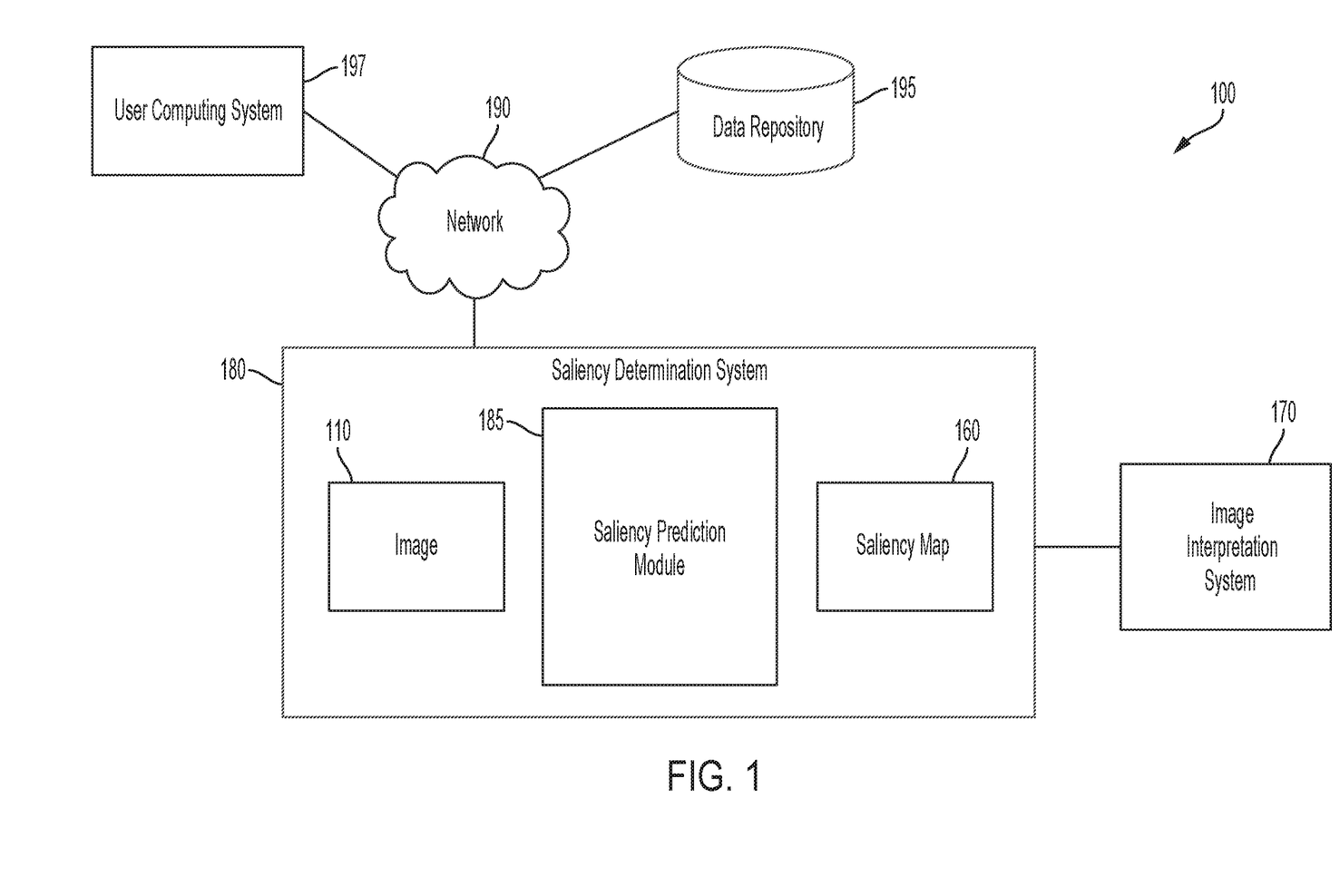
FIG. 1 is a block diagram depicting an example of a computing environment in which saliency data is determined for an image, according to certain embodiments.

Referring now to the drawings, FIG. 1 is a diagram depicting an example of an environment 100 in which saliency is determined for an image. The environment 100 includes a saliency determination system 180, and a saliency prediction module 185. In some embodiments, the saliency prediction module 185 is included in the saliency determination system 180, as depicted in FIG. 1. Additionally or alternatively, the saliency prediction module 185 and the saliency determination system 180 communicate via one or more networks, such as network 190. In some cases, the saliency prediction module 185 is location-sensitive. For example, a location-sensitive saliency prediction module generates location-sensitive saliency data for an image. In addition, the location-sensitive saliency data is used in technical applications.

The saliency prediction module 185 receives an image for saliency determination, such as an image 110. The image 110 includes visual content that is represented by data in the image 110, such as pixels, vector graphics, or other data representations. In some cases, the visual content is realistic, such as a photograph (or other realistic depiction) of human figures, animals, vehicles, buildings, landscape, or other realistic visual content. Additionally or alternatively, the visual content is non-representational, such as a graphical design, an advertisement, abstract artwork, or other non-realistic visual content. In some cases, the image 110 is received from an external source, such as a data repository 195 or a user computing system 197 (e.g., a personal computer, a tablet computer, a smartphone). In some cases, the external source is a network-accessible virtual storage or computing system (e.g., a "cloud" configuration) that is accessible via the network 190.

In the environment 100, the saliency prediction module 185 generates a saliency map 160 based on the received image 110. In some embodiments, the saliency prediction module 185 generates the saliency map 160 based on location-sensitive saliency determination techniques. The saliency map 160 includes data indicating one or more salient regions of the image 110, such as a region of image 110 that draws attention quickly as compared to other regions of the image 110. In some cases, the saliency prediction module 185 generates the saliency map 160 in response to information received from the saliency determination system 180. The information can include a command to generate the saliency map 160, such as a command generated by the saliency determination system 180 or received via an associated user interface. Additionally or alternatively, the saliency prediction module 185 generates the saliency map 160 in response to information received from the user computing system 197. For example, the user computing system 197 can provide, via the network 190, a command to one or both of the saliency determination system 180 or the saliency prediction module 185 to generate the saliency map 160.

In an embodiment, the saliency prediction module 185 provides the saliency map 160 related to the image 110. For example, the saliency map 160 is provided to the user computing system 197, or to an associated user interface. The saliency map 160 provides information to a user of the user computing system 197, such as information about a graphic design (or other visual information) that is being developed via the user computing system 197.

Additionally or alternatively, the saliency map 160 is provided to one or more additional computing systems, such as an image interpretation system 170. In some cases, the image interpretation system 170 performs additional computer-implemented techniques based on the saliency map 160. For example, the image interpretation system 170 performs operations for technical applications based on the saliency map 160, such as operations for artificial vision in a robotic system, operations for event identification in security or surveillance systems, or operations for other suitable technical applications.

In some cases, location-sensitive saliency data, such as in the example saliency map 160, improves efficiency or accuracy of a technical application implemented by the image interpretation system 170. For example, by providing a more accurate representation of which areas of the image 110 draw attention of a viewer, the location-sensitive saliency data in the map 160 enables the image interpretation system 170 to more effectively perform the technical applications.

Figure 2:
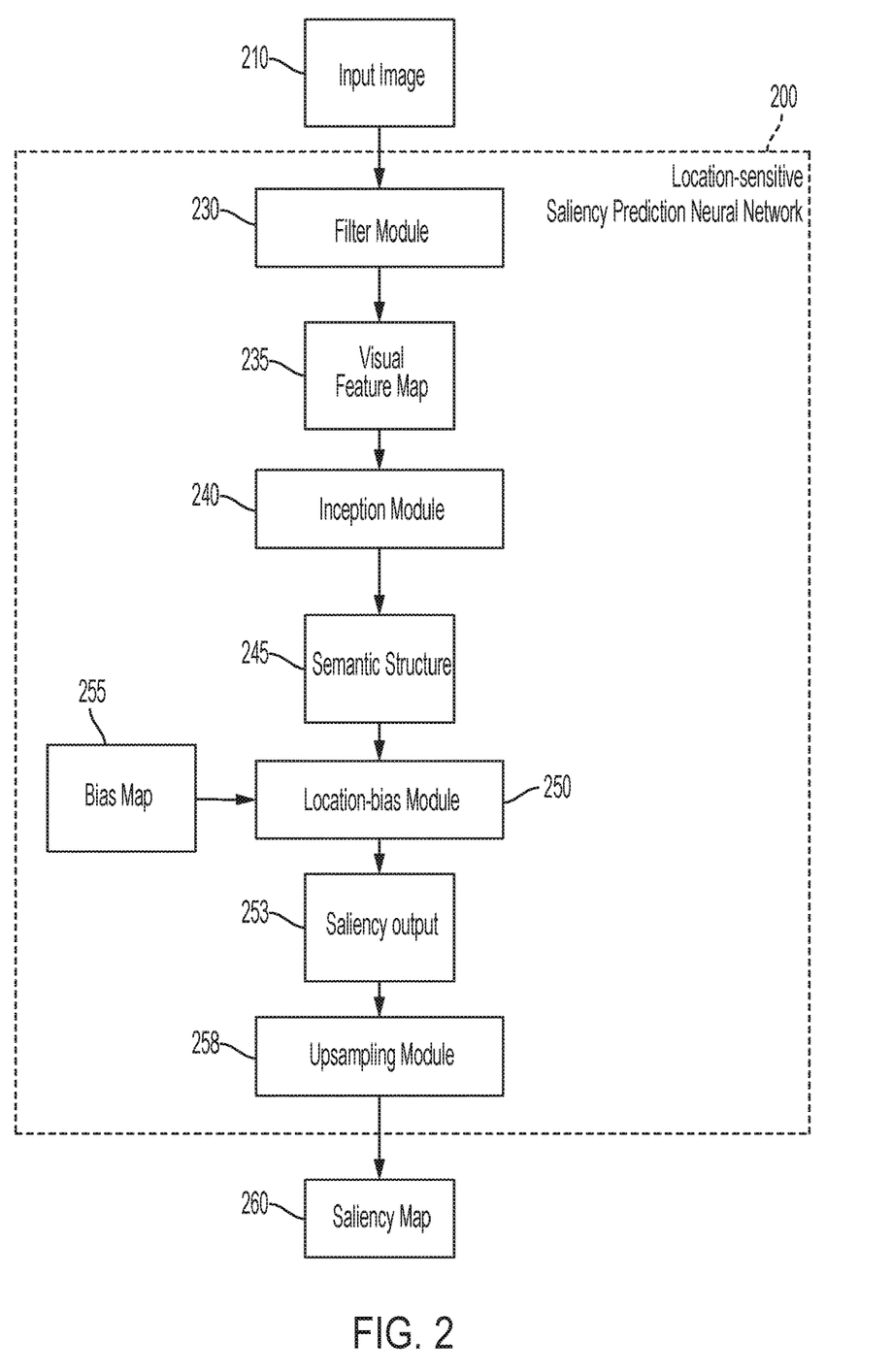
FIG. 2 is a diagram depicting an example of a location-sensitive saliency prediction neural network, according to certain embodiments.

In some embodiments, a saliency prediction module includes one or more neural networks. Additionally or alternatively, the one or more neural networks are configured together, such as a group of related neural networks that are trained together to produce output based on a given input image. FIG. 2 is a diagram depicting an example of a location-sensitive saliency prediction neural network 200. In some embodiments, the location-sensitive saliency prediction neural network 200 is included in a saliency prediction module, such as the saliency prediction 185. Additionally or alternatively, the location-sensitive saliency prediction neural network 200 includes multiple sub-networks, such as one or more of a filter module 230, an inception module 240, or a location-bias module 250. In some cases, the neural networks, or sub-networks, or both, are comprised of layers. A convolutional layer performs operations related to a convolution technique. Additionally or alternatively, a max-pool layer performs operations related to a maximum pooling technique. In some cases, the neural networks, or sub-networks, or both, include blocks of layers, such as a block of layers that are trained to perform operations together.

The location-sensitive saliency prediction neural network 200 receives an input image 210. The image 210 is received, for example, from a data repository, a cloud-configured storage or computing system, or an additional computing system (such as the user computing system 197). In some cases, the image 210 is comprised of pixels (e.g., an image in a jpeg, or bitmap file format). Additionally or alternatively, the image 210 is comprised of vector-based graphical information (e.g., an image in a .svg, .ai, or .dwg file format). In some cases, an image including vector-based data is converted to an image including pixel-based data.

In some embodiments, the image 200 is received by the filter module 230. The filter module 230 is trained to extract visual features from an image, such as the image 210. In some cases, the filter module 230 includes one or more neural networks. For example, the filter module 230 include multiple layers, such as convolutional layers including one or more convolutional neural network ("CNN"). Additionally or alternatively, the filter module 230 is trained to provide a visual feature map 235 based on the extracted visual features. For example, the feature map 235 includes data describing the visual features extracted by the filter module 230. In some cases, the feature map 235 includes visual features at multiple scales, such as at a local level and at a global level of context. Although FIG. 2 depicts the filter module 230 as providing a particular feature map 235, other implementations are possible. For example, a filter module could provide multiple visual feature maps generated by multiple layers included in the filter module.

In the location-sensitive saliency prediction neural network 200, the feature map 235 is received by the inception module 240. The inception module 240 is trained to determine semantic structure of the image 210 based on the extracted visual features. Additionally or alternatively, the inception module 240 determines a multi-scale semantic structure, such as semantics of the image 210 at a small scale and at a large scale. In some cases, the inception module 240 includes one or more neural networks. For example, the inception module 240 includes multiple inception blocks, each inception block including one or more convolutional layers or maxpool layers. Additionally or alternatively, the inception module 240 is trained to provide a semantic structure 245 based on the determined semantic context of the image 210. In some cases, the semantic structure 245 is a multi-scale semantic structure, and includes the determined semantics, at multiple scales, of the image 210.

The semantic structure 245 is received by the location-bias module 250 included in the location-sensitive saliency prediction neural network 200. In some cases, the location-bias module 250 includes one or more center-biased convolutional filter layers. The location-bias module 250 is trained to determine saliency of regions in the image 210. For example, the location-bias module 250 generates a saliency map 260 based on, at least, the semantic structure 245. Additionally or alternatively, the saliency map 260 is generated based on data representing one or more location-specific features associated with image regions, such as a bias map 255. In some cases, the location-specific features included in the bias map 255 represent location-dependent viewing patterns, such as a center-bias associated with a central region of an image, a horizon-bias associated with a horizontal region of an image, or other viewing patterns.

In some embodiments, the location-sensitive saliency prediction neural network 200 provides location-sensitive saliency data, such as the saliency map 260. In some cases, a saliency output 253 of the location-bias module 250 is provided to an additional convolutional layer configured to upsample the saliency output, such as an upsampling module 258. The upsampling module 258 is configured, for example, to increase a resolution of the saliency data represented by the saliency output 253, such as to match a resolution of the received image 210. In some cases, the saliency map 260 is provided as a digital mask, such as a greyscale image in which pixel values (e.g., 0 to 255) indicate a saliency of the image region corresponding to each pixel (e.g., 0 for a non-salient region, 255 for a highly salient region). Additionally or alternatively, the saliency map 260 includes numerical data associated with the image 210, such as a set of probabilities. Each probability in the set indicates, for example, a likelihood of whether a given pixel is salient or non-salient. Although FIG. 2 depicts the saliency map 260 as being provided by the output of the upsampling module 258, other implementations are possible. For example, the location-bias module 250 could provide a location-sensitive saliency map, which may (but need not necessarily) have a resolution matching match the resolution of the image 210.

In some embodiments, a location-sensitive saliency prediction neural network includes modules having different components or functionality. For example, a location-sensitive saliency prediction neural network includes a module with respective neural networks or sub-networks, such that a first module includes a first neural network with first structure and training, and a second module includes a second neural network with second structure and training. In some cases, an output of the first neural network is received as an input by the second neural network.

Figure 3:
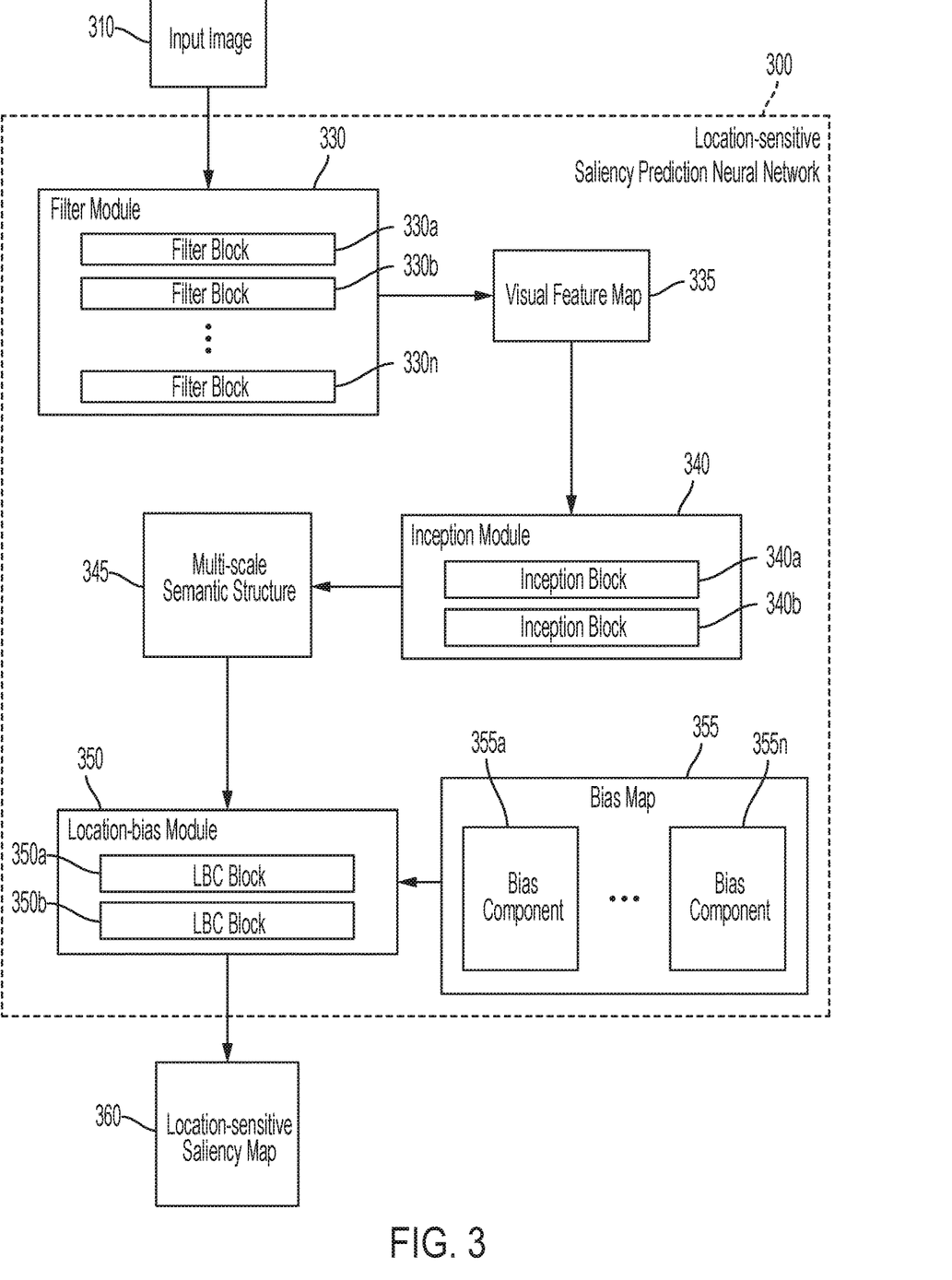
FIG. 3 is a diagram depicting an example configuration of a location-sensitive saliency prediction neural network with multiple modules, according to certain embodiments.

FIG. 3 is a diagram depicting an example of a location-sensitive saliency prediction neural network 300 with multiple modules. Each module includes, for example, one or more blocks, such as neural networks or sub-networks implemented via programming code executable by processing hardware. For example, a block (e.g., sub-network) is implemented via programming code to perform operations described in various examples discussed herein. In some embodiments, the location-sensitive saliency prediction neural network 300 is included in a saliency prediction module, such as the saliency prediction module 185. The location-sensitive saliency prediction neural network 300 receives an input image 310, such as described at least in regards to FIG. 2. In some cases, the input image 310 has a size including a width w, a height h, and a number of image channels c. The size of the input image 310 is represented, for example, via the notation w×h×c. As a non-limiting example, an input image having a width of 100 pixels, a height of 100 pixels, and three image channels (e.g., red, green, blue) has a size notated as 100×100×3.

The location-sensitive saliency prediction neural network 300 includes one or more filter modules, such as a filter module 330. The filter module 330 includes filter blocks that are configured to determine features of the input image, such as filter blocks 330a, 330b, through 330n. Each of the filter blocks 330a through 330n includes a group of layers, such as group including one or more of a convolutional layer or a maxpool layer. In some cases, a maxpool layer included in a filter block reduces computational resources required to identify the higher-level semantic features. Additionally or alternatively, each of the filter blocks 330a through 330n have one or more channels and a receptive field. In some embodiments, one or more of the filter blocks 330a through 330n have a particular quantity or combination of layers, a particular number of channels as output, or a particular receptive field size.

In FIG. 3, the location-sensitive saliency prediction neural network 300 is configured such that an output of a previous filter block is provided as an input to a subsequent filter block. Additionally or alternatively, the location-sensitive saliency prediction neural network 300 is configured such that a filter block configured to determine relatively low-level visual features is arranged prior to a subsequent filter block configured to determine relatively high-level visual features. In some cases, progressively increasing the contextual level of visual features identified by the filter blocks 330a through 330n improves identification of progressively higher-level semantic features of the image 310.

In some embodiments, each of the filter blocks 330a through 330n is configured to determine visual features at a respective contextual level based on a number of channels in the filter block. For example, a filter block present in a relatively early stage of the filter module 330 (e.g., prior to other filter blocks in the module 330) is configured to determine relatively low-level visual features at a local context, such as color, edges (e.g., horizontal, vertical, diagonal), curves, corner, brightness, or other low-level graphical characteristics of the image. In some cases, the filter block at the relatively early stage provides a relatively small number of channels as output. Additionally or alternatively, a filter block present in a relatively later stage of the filter module 330 (e.g., subsequent to other filter blocks in the module 330) is configured to determine relatively high-level visual features at a regional or global context, such as faces, figures, poses, relationships between depicted objects, or other high-level semantic characteristics of the image. In some cases, the filter block at the relatively later stage provides a relatively large number of channels as output. In some cases, the filter module 330 is configured such that an output from a filter block having a relatively small number of channels as output is provided as an input to an additional filter block having a relatively larger number of channels as output. For example, if filter block 330a is configured to have 64 channels as output, an output from block 330a could be provided as an input to filter block 330b having, for instance, 128 channels as output.

Additionally or alternatively, each of the filter blocks 330a through 330n is configured to determine visual features at a respective contextual level based on a receptive field of the filter block. For example, a filter block having a relatively small receptive field performs an operation based on a relatively small number of pixels corresponding to the receptive field. Additionally or alternatively, a filter block having a relatively wide receptive field performs an operation based on a relatively large number of pixels corresponding to the receptive field. In some cases, a filter block with a relatively wide receptive field is able to capture large-scale or global context of an image, such as poses of figures depicted in the image, relationships of figures to each other or to other content in the image, or other large-scale semantic content.

In some cases, a wide-field filter block having a relatively wide receptive field, as compared to other filter blocks included in the filter module 330, is configured to include holes in one or more convolutional kernels. For instance, a convolutional layer in the wide-field filter block is configured to apply the convolutional kernel to an input of the convolutional layer. The convolutional kernel is augmented by inclusion of one or more holes. The holes have, for example, zero values (or otherwise non-computed values) that are introduced between computed values in the convolutional kernel. Based on the holes in a convolutional kernel, the wide-field filter block performs an operation based on pixels corresponding to non-hole values in the receptive field. In some cases, a wide-field filter block with holes in the receptive field captures large-scale or global semantic content without increasing a quantity of operations performed, or a number of parameters calculated, by the wide-field filter block. For example, in a 5×5 convolutional kernel where every other value is a hole, the wide-field filter block performs operations for each non-hole value, reducing the overall computing resources (e.g., fewer computations, fewer parameters) used by the wide-field filter block while capturing a larger scale of semantic content. Table 1 provides an example of a convolutional kernel having a relatively small receptive field of dimensions 3×3. Table 2 provides an example of a convolutional kernel having a relatively wide receptive field of dimensions 5×5. In Table 2, the example convolutional kernel includes holes at every other value. In some cases, the filter module 330 is configured such that an output from a filter block having a relatively small receptive field is provided as an input to an additional filter block having a relatively wide receptive field. For example, if filter block 330n has a wide receptive field of size 5×5, the filter block 330n may receive, as an input, an output from a previous filter block having, for example, a small receptive field of size 3×3.

TABLE 1

| 3  | 1  | 1  |
|----|----|----|
| -3 | -4 | 2  |
| 1  | 3  | -2 |

TABLE 2

| 3  | 0 | 1  | 0 | 1  |
|----|---|----|---|----|
| 0  | 0 | 0  | 0 | 0  |
| -3 | 0 | -4 | 0 | 2  |
| 0  | 0 | 0  | 0 | 0  |
| 1  | 0 | 3  | 0 | -2 |

In FIG. 3, the filter module 330 generates a representation of the extracted features, such as a visual feature map 335. The feature map 335 includes, for instance, visual features at multiple contextual levels, such as low-level visual features indicating graphical characteristics and high-level visual features indicating semantic characteristics. In some cases, the feature map 335 is provided to one or more inception modules included in the location-sensitive saliency prediction neural network 300, such as an inception module 340. The inception module 340 includes inception blocks that are configured to determine semantic structure of the input image, such as inception blocks 340a and 340b. Each of the inception blocks 340a and. 340b includes a group of layers, such as convolutional layers or maxpool layers. Additionally or alternatively, each of the inception blocks 340a and 340b have one or more channels and a receptive field for each constituent layer included in the respective inception block. In some embodiments, one or more of the inception blocks 340a and 340b have a particular quantity or combination of layers, a particular number of channels, or a particular receptive field size for each of its constituent layers. The location-sensitive saliency prediction neural network 300 is configured such that an output of a previous inception block is provided as an input to a subsequent inception block.

In some cases, semantic content included in the image 310 is represented by one or more semantic structures determined by the inception module 340. The inception module 340 generates, for example, a semantic structure characterizing semantic content of the image 310 at multiple scales, such as a multi-scale semantic structure 345. Additionally or alternatively, increasing the variety of scale represented by the semantic structure improves representation of content depicted in the image 310. For example, a small-scale semantic structure could represent small-scale content in a particular region of the image 310. A non-limiting example of small-scale content could indicate a human figure depicted on a left side of the image 310. Additionally or alternatively, a large-scale semantic structure could represent large-scale content across multiple regions of the image 310. Continuing the above example, large-scale content could indicate that the human figure is standing upright and is interacting with an object depicted on a right side of the image 310.

In some embodiments, each of the inception blocks 340a and 340b is configured to determine semantic structure at multiple scales, based on multiple parallel layers within each inception block. For example, an inception block includes multiple layers configured to operate in parallel to analyze an input to the inception block. The inception block 340a, for example, receives as an input the feature map 335, and the inception block 340b receives, as an input, an output from the inception block 340a. In each inception block, at least one of the multiple parallel layers is configured to generate a relatively small-scale semantic structure, based on one or more of a relatively small receptive field or a relatively small number of channels included in the small-scale layer. Additionally or alternatively, each inception block includes at least one of the multiple parallel layers that is configured to generate a relatively large-scale semantic structure, based on one or more of a relatively wide receptive field or a relatively large number of channels included in the large-scale layer. In some cases, one or more of the inception blocks 340a and 340b is configured to concatenate the semantic structures generated by the multiple parallel layers. For example, the multi-scale semantic structure 345 includes a concatenation of the semantic structures generated by the parallel layers in the inception block 340b.

In FIG. 3, the multi-scale semantic structure 345 is provided to one or more location-bias modules included in the location-sensitive saliency prediction neural network 300, such as a location-bias module 350. The location-bias module 350 includes one or more location-biased convolutional ("LBC") blocks that are configured to determine location-sensitive saliency of content depicted in the input image, such as LBC blocks 350a and 350b. Each of the LBC blocks 350a and 350b includes at least one layer, such as a location-biased convolutional layer. In some implementations, each of the LBC blocks 350a and 350b includes only one layer, such that the LBC layer is also the LBC block. Additionally or alternatively, each of the LBC blocks (or layers) 350a and 350b has a receptive field. In some embodiments, one or more of the LBC blocks 350a and 350b have a particular quantity or combination of layers, a particular number of channels, or a particular receptive field size. In some cases, one or more of the LBC blocks 350a or 350b have a receptive field of a very large size relative to the receptive fields of blocks included in the filter module 330 or the inception module 340. For example, if one or more of the modules 330 or 340 includes a block with a small receptive field of size 3×3 and a block with a large receptive field of size 5×5, one or more of the LBC blocks 350a or 350b could have a very large receptive field of size 25×25. In some embodiments, the very large receptive field includes holes, such as to reduce computation resources and parameters required to perform operations. Using the above example, if one or more of the LBC blocks 350a or 350b has a very large receptive field of size 25×25, the field could include relatively large holes of size 6 (e.g., six zero values that are introduced between each of the computed values). In some cases, the introduction of holes into a large or very large receptive field allows identification of large-scale features, structures, or saliency data, while reducing or maintaining computing resources required for the identification operations.

In some cases, the location-bias module 350 is configured to generate saliency data, such as location-sensitive saliency map 360, that represents location-sensitive saliency of content in the image 310. For example, the saliency map 360 indicates a saliency of a corresponding region (or regions) of the image 310, such as by providing a set of values corresponding to pixels included in the image 310. In some embodiments, the saliency map 360 is provided as a set of values, in which each value indicates a saliency of a corresponding pixel in the image 310. Additionally or alternatively, the saliency map 360 is provided as a digital mask, such as a black-and-white or greyscale image, in which each pixel of the mask indicates a saliency of a corresponding pixel of the image 310; or as numerical data, such as a matrix or set of probabilities corresponding to respective pixels of the image 310; or other suitable representations (or combinations of representations).

Figure 6:
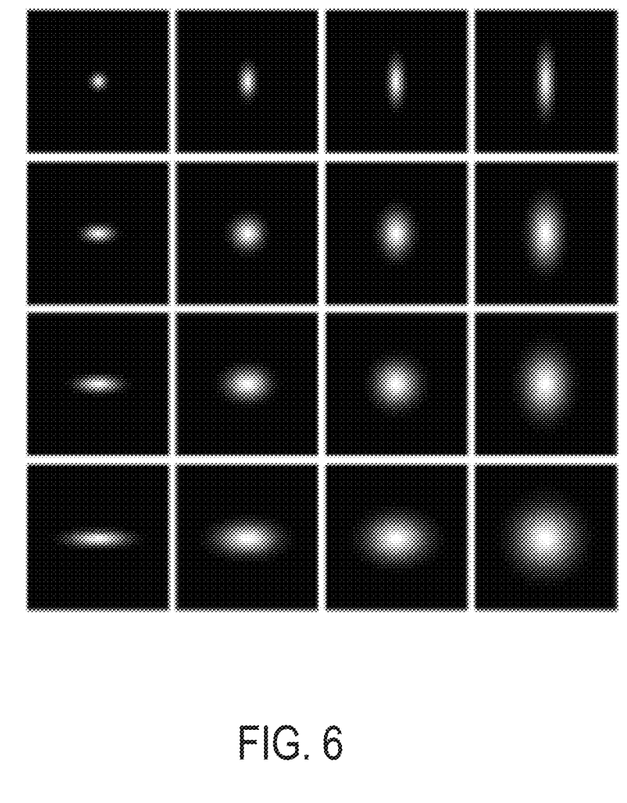
FIG. 6 is a diagram depicting an example group of location-specific features.

In the location-sensitive saliency prediction neural network 300, each of the LBC blocks 350a and 350b is configured to perform one or more convolutional operations on an input. In some cases, the location-sensitive saliency prediction neural network 300 is configured such that an output of a previous LBC block is provided as an input to a subsequent LBC block. The LBC block 350a, for example, receives as an input the multi-scale semantic structure 345, and the LBC block 350b receives, as an input, an output from the LBC block 350a. Additionally or alternatively, each of the LBC blocks 350a and 350b receives as an input a bias map, such as a bias map 355. The bias map 355 includes one or more location-specific features that correspond to regions of the image 310. In some cases, each location-specific feature is represented by a bias component. For example, the bias map 355 includes bias components 355a through 355n, each of which represent a particular location-specific feature. FIG. 6 provides a non-limiting example of a group of location-specific features. For instance, each of the bias components 355a through 355n could represent a particular one of the example location-specific features in FIG. 6, such as a vector (or matrix) of values having a horizontal variance or a vertical variance. Although FIG. 6 depicts example location-specific features that are center-biased, other implementations are possible. For example, a bias map could represent a location-specific feature that is skewed towards an edge or corner (e.g., foreground-weighted saliency data for a self-driving vehicle). Additionally or alternatively, a bias map could represent a multi-focus location-specific feature with multiple focus areas (e.g., left and right focus areas for composite images in a binocular vision system).

In FIG. 3, the location-bias module 350 generates the location-sensitive saliency map 360 based on convolutional operations performed on a combination of the multi-scale semantic structure 345 and the bias map 355. For example, the LBC block 350a receives the multi-scale semantic structure 345 and the bias map 355. The LBC block 350a concatenates the bias map 355 to the end of the multi-scale semantic structure 345, such as by concatenating each of the bias components 355a through 355n as an additional channel. Additionally or alternatively, the LBC block 350a performs a convolution operation on the combined inputs (e.g., the concatenation of structure 345 and map 355). The convolution operation includes, for example, one or more learned weighting factors, such as weighting factors associated with the location-specific features represented in the bias map 355. In some cases, the convolution operation provides an output that has a number of channels equivalent to the multi-scale semantic structure 345, and this output is received as an input by the LBC block 350b. The LBC block 350a concatenates the bias map 355 to the end of the input, and performs an additional convolution operation on the combined inputs (e.g., the concatenation of map 355 and the input received from LBC block 350a). In some cases, the LBC block 350b provides the location-sensitive saliency map 360, such as based on an output from the block 350b. Additionally or alternatively, the location-bias module 350 provides the output from the LBC block 350b to an upsampling module, such as the upsampling module 258 as described in regards to FIG. 2, and the location-sensitive saliency map 360 is based on an upsampling of the output from the block 350b.

In some cases, generating the location-sensitive saliency map 360 based on the location-specific features represented by the bias map 355 improves training of the neural networks or sub-networks included in the location-sensitive saliency prediction neural network 300. For example, a learned weight for a location-specific feature offers a more accurate analysis of image content, in comparison to a fixed parameter value (e.g., a uniform center-bias applied by a conventional saliency prediction system). Additionally or alternatively, configuring and training the location-sensitive saliency prediction neural network 300 to generate the location-sensitive saliency map 360 based on location-specific features offers more accurate saliency data, such as via end-to-end training of the neural networks or sub-networks included in the location-sensitive saliency prediction neural network 300.

Figure 4:
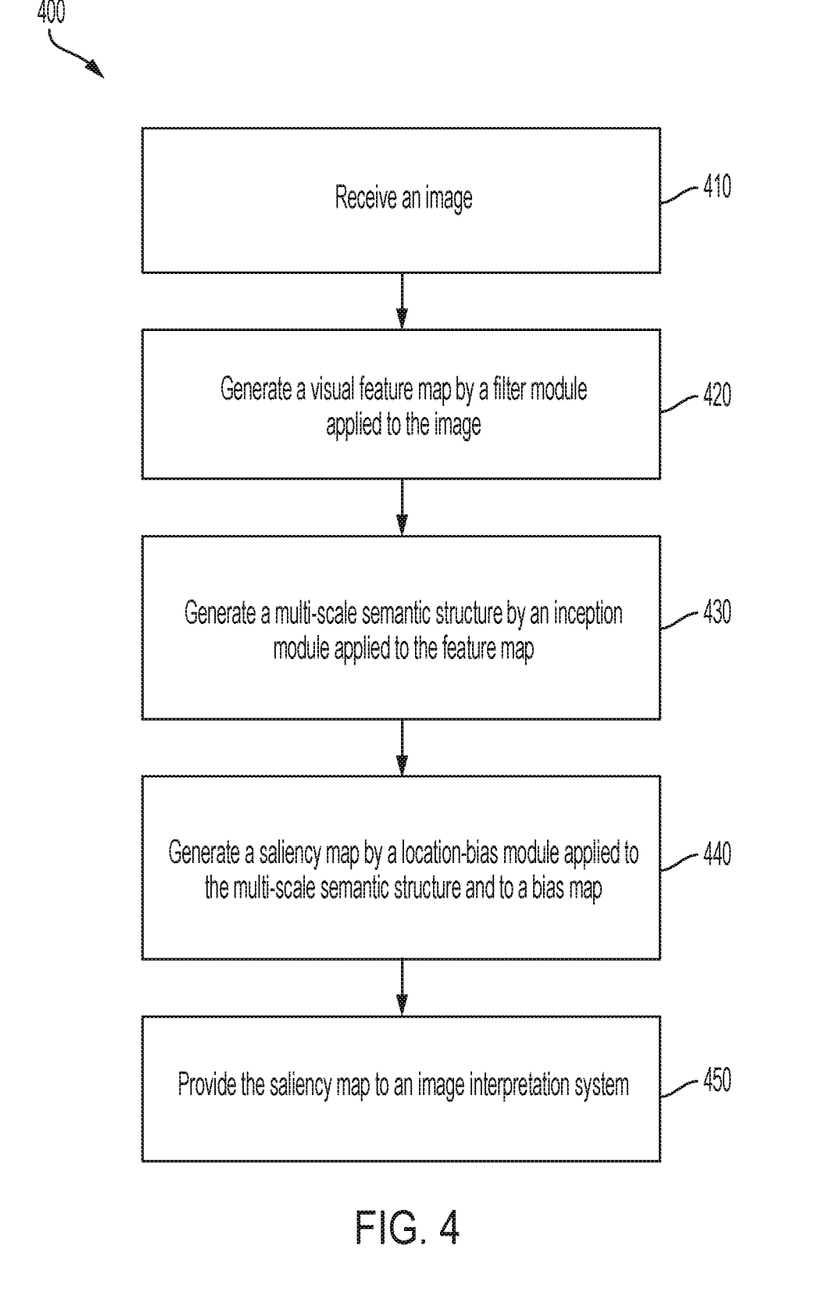
FIG. 4 is a flow chart depicting an example of a process for generating location-sensitive saliency data, according to certain embodiments.

FIG. 4 is a flow chart depicting an example of a process 400 for generating location-sensitive saliency data. In some embodiments, such as described in regards to FIGS. 1-3, a computing device executing a location-sensitive saliency prediction neural network implements operations described in FIG. 4, by executing suitable program code. For illustrative purposes, the process 400 is described with reference to the examples depicted in FIGS. 1-3. Other implementations, however, are possible.

At block 410, the process 400 involves receiving an image. For example, an saliency prediction module, such as the saliency prediction module 185, receives a graphical digital image, such as image 110. Additionally or alternatively, a location-sensitive saliency prediction neural network, such as the location-sensitive saliency prediction neural network 300, receives the image, such as the image 310. In some embodiments, the image depicts semantic content at a global level, such as content that is depicted at multiple locations of the image. In some cases, the received image includes pixels, or is modified to include pixels.

At block 420, the process 400 involves generating a visual feature map based on features of the received image. In some embodiments, the visual feature map, such as the visual feature map 335, is generated by applying to the image a filter module that is included in the location-sensitive saliency prediction neural network. In some cases, the filter module, such as the filter module 330, includes one or more filter blocks, such as the filter blocks 330a through 330n, configured for extracting visual features at one or more contextual levels. In some embodiments, particular ones of the filter blocks are configured to extract relatively low-level visual features at a local context, such as a first filter block having a relatively small number of channels, a relatively small receptive field, or both. Additionally or alternatively, particular ones of the filter blocks are configured to extract relatively high-level visual features at a regional or global context, such as a second filter block having a relatively large number of channels, a relatively wide receptive field, or both.

At block 430, the process 400 involves generating a multi-scale semantic structure based on the visual feature map. In some embodiments, the multi-scale semantic structure is generated by applying, to the visual feature map, an inception module included in the location-sensitive saliency prediction neural network. In some cases, the inception module, such as the inception module 340, includes one or more inception blocks, such as the inception blocks 340a and 340b, configured for determining semantic structure of the received image at multiple scales. For example, the inception module generates a multi-scale semantic structure, such as the multi-scale semantic structure 345. In some embodiments, the inception block (or blocks) includes multiple layers configured to operate in parallel to analyze the visual feature map (or an output from a previous inception block). In the inception block, at least one of the parallel layers is configured to generate a relatively small-scale semantic structure, such as a small-scale layer having a relatively small number of channels, a relatively small receptive field, or both. Additionally or alternatively, at least one of the parallel layers is configured to generate a relatively large-scale semantic structure, such as a large-scale layer having a relatively large number of channels, a relatively wide receptive field, or both.

At block 440, the process 400 involves generating a saliency map, such as a location-sensitive saliency map, based on the multi-scale semantic structure. In some embodiments, the saliency map is generated by applying, to the multi-scale semantic structure, a location-bias module included in the location-sensitive saliency prediction neural network. In some cases, the location-bias module, such as the location-bias module 350, includes one or more LBC blocks, such as the LBC blocks 350a and 350b, that are configured for determining location-sensitive saliency of content depicted in the received image. In some embodiments, the LBC block (or blocks) includes an LBC layer that receives as an input the multi-scale semantic structure (or an output from a previous LBC block), and a bias map that includes one or more location-specific features that correspond to regions of the received image. The LBC layer concatenates the bias map and the multi-scale semantic structure, and performs a convolutional operation on the concatenated data structure. Additionally or alternatively, the LBC layer performs the convolutional operation using a very wide receptive field. In the location-bias module, at least one of the LBC blocks is configured to generate a location-sensitive saliency map, such as the location-sensitive saliency map 360, based on the concatenation of the bias map and the multi-scale semantic structure. In some cases, applying the very wide receptive field to the concatenated data structure enables the LBC block(s) to determine location-sensitive saliency data that accounts for global-level semantic content of the received image. For example, semantic content (e.g., represented in the multi-scale semantic structure) that is visible in large or global regions of the received image is analyzed via the very wide receptive field. Based on the analysis of the large regions, the location-sensitive saliency map indicates in what regions of the received image salient content is located.

At block 450, the process 400 involves providing the saliency map to an image interpretation system, such as the image interpretation system 170. For example, the image interpretation system is configured to perform operations for one or more technical applications based on the location-sensitive saliency map, such as the location-sensitive saliency map 360.

In some embodiments, a location-sensitive saliency prediction neural network is trained to perform location-biased convolutional operations (such as operations described in regards to the LCB blocks 350a and 350b). A convolutional layer (such as an LBC layer) receives an input, such as a multi-scale semantic structure. In some cases, a component of the convolutional layer generates a response R as an output of a convolutional operation performed by the component. The response R is generated, for instance, based on a spatial location (x, y) of the input. For a convolutional layer including multiple components, the response of the cth component is designated as $R_c$.

In some cases, the response $R_c$ of the component c at the spatial location (x, y) is spatially variant, such as from a location-biased convolutional operation performed by a component of an LBC layer. The example Equation 1 describes an example of a spatially variant response $R_c$.

$$R_C(x, y) = \mathcal{R}\left(\sum_{i,j} \left(I(x+i, y+j) \cdot W_C(i, j) + L(x+i, y+j) \cdot W'_C(i, j) + b_c\right)\right) \quad \text{Eq. 1}$$

In Equation 1, the notation • indicates a dot product and the notation $\mathcal{R}$ indicates a rectified linear unit ("ReLU") activation function. In addition, the term I(x+i, y+j) indicates a visual feature vector associated with the spatial location (x, y). The Equation 1 includes a summation across positions i and j of the visual feature vector associated with the position (x, y).

In some cases, Equation 1 includes one or more spatially invariant terms. For example, the terms Wc(i, j) and $b_c$ are not based on the spatial location (x, y). The term $W_c(i, j)$ describes weights of the cth component of the convolutional layer. In addition, the term $b_c$ describes a bias of the cth component.

Additionally or alternatively, Equation 1 includes one or more spatially variant terms. For example, the term L(x+i, y+j) describes location-specific features (such as a bias map). In addition, the term $W'_c(i, j)$ describes weights of the location-specific features (learned weights for the locations in the bias map). In Equation 1, the terms L(x+i, y+j) and $W'_c(i, j)$ are independent of the size of the input received by the convolutional layer. In some cases, the independence of the terms L(x+i, y+j) and $W'_c(i, j)$ from the size of the input allows computation of Equation 1 using reduced computing resources, such as by maintaining the resources required to compute terms L(x+i, y+j) and $W'_c(i, j)$ for various sizes of inputs.

Figure 5:
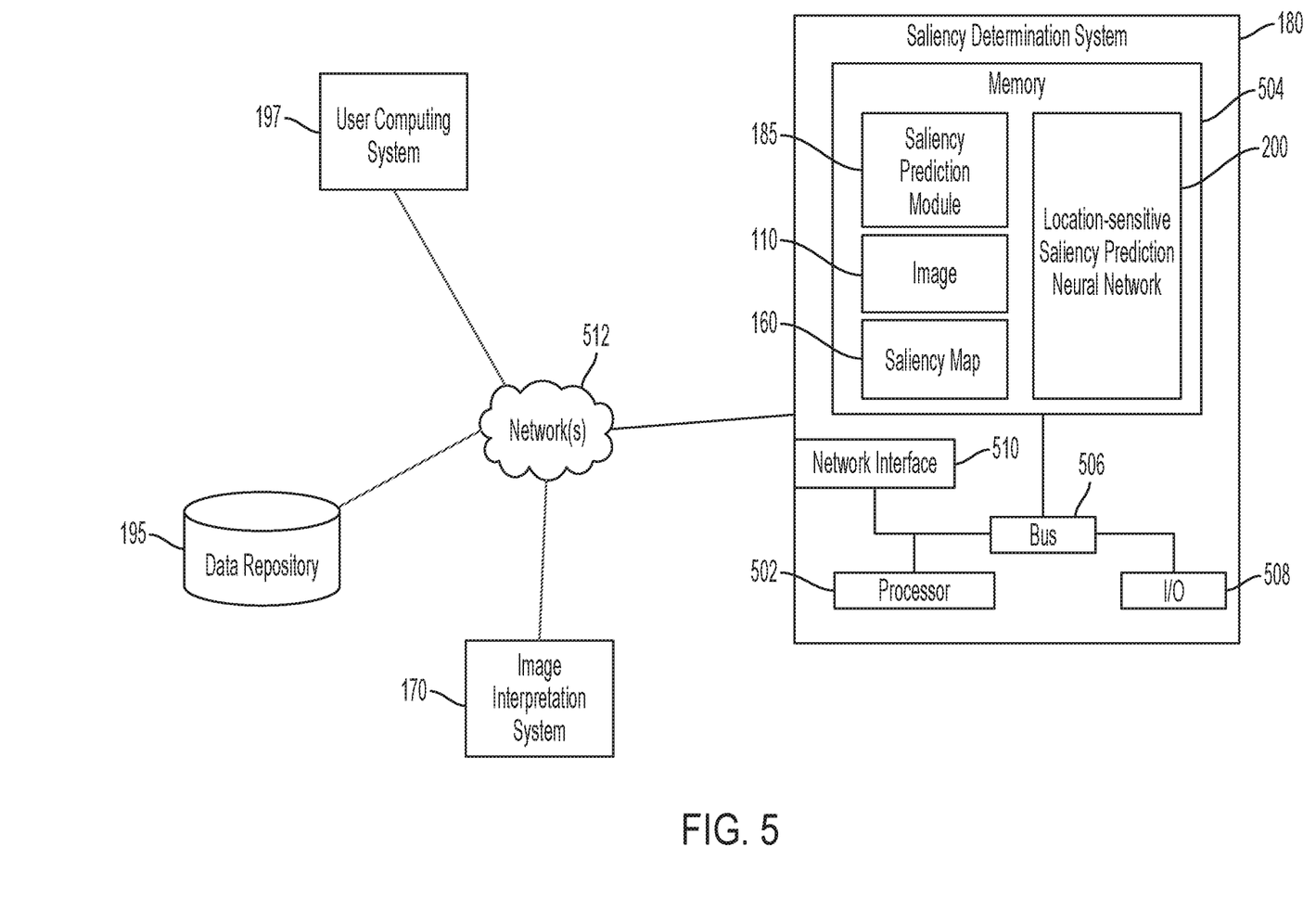
FIG. 5 is a block diagram depicting an example of a computing system for performing location-sensitive saliency prediction, according to certain embodiments.

Any suitable computing system or group of computing systems can be used for performing the operations described herein. For example, FIG. 5 is a block diagram depicting a computing system that is capable of performing location-sensitive saliency prediction, according to certain embodiments. For illustrative purposes, the computing system depicted in FIG. 5 is described with reference to the examples depicted in FIGS. 1-4. Other implementations, however, are possible.

The depicted example of a saliency determination system 180 includes one or more processors 502 communicatively coupled to one or more memory devices 504. The processor 502 executes computer-executable program code or accesses information stored in the memory device 504. Examples of processor 502 include a microprocessor, an application-specific integrated circuit ("AMC"), a field-programmable gate array ("FPGA"), or other suitable processing device. The processor 502 can include any number of processing devices, including one.

The memory device 504 includes any suitable non-transitory computer-readable medium for storing the saliency prediction module 185, the location-sensitive saliency prediction neural network 200, the image 210, the saliency map 260, and other received or determined values or data objects. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The saliency determination system 180 may also include a number of external or internal devices such as input or output devices. For example, the saliency determination system 180 is shown with an input/output ("I/O") interface 508 that can receive input from input devices or provide output to output devices. A bus 506 can also be included in the saliency determination system 180. The bus 506 can communicatively couple one or more components of the saliency determination system 180.

The saliency determination system 180 executes program code that configures the processor 502 to perform one or more of the operations described above with respect to FIGS. 1-4. The program code includes operations related to, for example, one or more of the saliency prediction module 185, the location-sensitive saliency prediction neural network 200, the image 210, the saliency map 260, or other suitable applications or memory structures that perform one or more operations described herein. The program code may be resident in the memory device 504 or any suitable computer-readable medium and may be executed by the processor 502 or any other suitable processor. In some embodiments, the program code described above, the saliency prediction module 185, the location-sensitive saliency prediction neural network 200, the image 210, and the saliency map 260 are stored in the memory device 504, as depicted in FIG. 5. In additional or alternative embodiments, one or more of the saliency prediction module 185, the location-sensitive saliency prediction neural network 200, the image 210, the saliency map 260, and the program code described above are stored in one or more memory devices accessible via a data network, such as a memory device accessible via a cloud service.

The saliency determination system 180 depicted in FIG. 5 also includes at least one network interface 510. The network interface 510 includes any device or group of devices suitable for establishing a wired or wireless data connection to one or more data networks 512. Non-limiting examples of the network interface 510 include an Ethernet network adapter, a modem, and/or the like. The saliency determination system 180 is able to communicate with one or more remote computing systems, such as the user computing system 197, the data repository 195 or the image interpretation system 170 using the network interface 510.

Although FIG. 5 depicts the image interpretation system 170 as being connected to saliency determination system 180 via the networks 512, other embodiments are possible, including the image interpretation system 170 running as a program in the memory 504 of saliency determination system 180.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method of predicting saliency in graphical digital images, the method comprising:
    receiving, by a location-sensitive saliency prediction neural network, a graphical digital image;
    generating a feature map of visual features included in the graphical digital image by applying, to the graphical digital image, a filter module of the location-sensitive saliency prediction neural network, wherein the filter module is configured to extract the visual features at multiple contextual levels and the feature map includes the visual features extracted at the multiple contextual levels;
    generating a multi-scale semantic structure by applying, to the feature map of the visual features extracted at the multiple contextual levels, an inception module of the location-sensitive saliency prediction neural network, the inception module configured to determine semantic content of the graphical digital image at multiple scales, wherein the multi-scale semantic structure is generated based on the determined semantic content at the multiple scales;
    generating, by a location-bias module of the location-sensitive saliency prediction neural network, a saliency map of location-dependent context of the graphical digital image, the saliency map based on a combination of (i) the multi-scale semantic structure and (ii) a bias map, the bias map indicating a location-specific weight of a region of the graphical digital image; and
    providing the saliency map to an image interpretation system.

2. The method of claim 1, wherein the filter module includes multiple filter layers, each of the multiple filter layers having a receptive field, and
    wherein a respective receptive field of at least one of the multiple filter layers is augmented by inclusion of at least one hole.

3. The method of claim 1, wherein the filter module includes multiple filter layers, each of the multiple filter layers including a quantity of channels, and
    wherein a first quantity of channels for a previous filter layer is less than or equal to a second quantity of channels for a subsequent filter layer.

4. The method of claim 1, wherein the inception module includes multiple layers configured for parallel analysis of the feature map generated by the filter module,
    the method further comprising:
        determining, via the parallel configuration of the multiple layers, multiple respective semantic structures based on the feature map; and
        generating the multi-scale semantic structure based on a concatenation of the multiple respective semantic structures.

5. The method of claim 4, wherein each of the multiple layers includes a respective kernel size, and
    wherein each of the multiple respective semantic structures represents a respective scale of the semantic content of the graphical digital image, the respective scale correlated to the respective kernel size.

6. The method of claim 1, wherein the bias map includes multiple weighting components, each of the weighting components indicating a respective horizontal and vertical variance of the location-specific weight.

7. The method of claim 1, the method further comprising, prior to providing the saliency map to the image interpretation system, upsampling the saliency map, wherein the upsampling is based on an original resolution of the graphical digital image.

8. A non-transitory computer-readable medium embodying program code for predicting saliency in digital images, the program code comprising instructions which, when executed by a processor, cause the processor to perform operations comprising:
receiving, by a location-sensitive saliency prediction neural network, a graphical digital image;
generating a feature map of visual features included in the graphical digital image by applying, to the graphical digital image, a filter module of the location-sensitive saliency prediction neural network, wherein the filter module is configured to extract the visual features at multiple contextual levels and the feature map includes the visual features extracted at the multiple contextual levels;
generating a multi-scale semantic structure by applying, to the feature map of the visual features extracted at the multiple contextual levels, an inception module of the location-sensitive saliency prediction neural network, the inception module configured to determine semantic content of the graphical digital image at multiple scales, wherein the multi-scale semantic structure is generated based on the determined semantic content at the multiple scales;
generating, by a location-bias module of the location-sensitive saliency prediction neural network, a saliency map of location-dependent context of the graphical digital image, the saliency map based on a combination of (i) the multi-scale semantic structure and (ii) a bias map, the bias map indicating a location-specific weight of a region of the graphical digital image; and
providing the saliency map to an image interpretation system.

9. The non-transitory computer-readable medium of claim 8, wherein the filter module includes multiple filter layers, each of the multiple filter layers having a receptive field, and
wherein a respective receptive field of at least one of the multiple filter layers is augmented by inclusion of at least one hole.

10. The non-transitory computer-readable medium of claim 8, wherein the filter module includes multiple filter layers, each of the multiple filter layers including a quantity of channels, and
wherein a first quantity of channels for a previous filter layer is less than or equal to a second quantity of channels for a subsequent filter layer.

11. The non-transitory computer-readable medium of claim 8, wherein the inception module includes multiple layers configured for parallel analysis of the feature map generated by the filter module,
the operations further comprising:
determining, via the parallel configuration of the multiple layers, multiple respective semantic structures based on the feature map; and
generating the multi-scale semantic structure based on a concatenation of the multiple respective semantic structures.

12. The non-transitory computer-readable medium of claim 11, wherein each of the multiple layers includes a respective kernel size, and
wherein each of the multiple respective semantic structures represents a respective scale of the semantic content of the graphical digital image, the respective scale correlated to the respective kernel size.

13. The non-transitory computer-readable medium of claim 8, wherein the bias map includes multiple weighting components, each of the weighting components indicating a respective horizontal and vertical variance of the location-specific weight.

14. A system for predicting saliency in digital images, the system comprising:
a location-sensitive saliency prediction neural network configured for receiving a graphical digital image;
a filter module of the location-sensitive saliency prediction neural network, the filter module configured to (i) extract, at multiple contextual levels, visual features included in the graphical digital image, and (ii) generate a feature map that includes the visual features extracted at the multiple contextual levels;
an inception module of the location-sensitive saliency prediction neural network, the inception module configured to (i) determine semantic content of the graphical digital image at multiple scales, and (ii) generate a multi-scale semantic structure based on the determined semantic content at the multiple scales; and
a location-bias module of the location-sensitive saliency prediction neural network configured to generate a saliency map of location-dependent context of the graphical digital image, the saliency map based on a combination of (i) the multi-scale semantic structure and (ii) a bias map indicating a location-specific weight of a region of the graphical digital image,
wherein the location-sensitive saliency prediction neural network is further configured for providing the saliency map to an image interpretation system.

15. The system of claim 14, wherein the filter module includes multiple filter layers, each of the multiple filter layers having a receptive field, and
wherein a respective receptive field of at least one of the multiple filter layers is augmented by inclusion of at least one hole.

16. The system of claim 14, wherein the filter module includes multiple filter layers, each of the multiple filter layers including a quantity of channels, and
wherein a first quantity of channels for a previous filter layer is less than or equal to a second quantity of channels for a subsequent filter layer.

17. The system of claim 14, wherein the inception module includes multiple layers configured for parallel analysis of the feature map generated by the filter module,
the inception module further configured for:
determining, via the parallel configuration of the multiple layers, multiple respective semantic structures based on the feature map; and
generating the multi-scale semantic structure based on a concatenation of the multiple respective semantic structures.

18. The system of claim 17, wherein each of the multiple layers includes a respective kernel size, and
wherein each of the multiple respective semantic structures represents a respective scale of the semantic content of the graphical digital image, the respective scale correlated to the respective kernel size.

19. The system of claim 14, wherein the bias map includes multiple weighting components, each of the weighting components indicating a respective horizontal and vertical variance of the location-specific weight.

20. The system of claim 14, wherein the saliency map is upsampled prior to providing the saliency map to the image interpretation system, wherein the upsampling is based on an original resolution of the graphical digital image.

* * * * *